(12) United States Patent
Hyde et al.

(10) Patent No.: US 7,423,539 B2
(45) Date of Patent: Sep. 9, 2008

(54) RFID TAGS COMBINING SIGNALS RECEIVED FROM MULTIPLE RF PORTS

(75) Inventors: John D. Hyde, Corvallis, OR (US); Omer Onen, Redmond, WA (US); Ronald A. Oliver, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

(21) Appl. No.: 11/213,632

(22) Filed: Aug. 26, 2005

(65) Prior Publication Data

US 2006/0049917 A1    Mar. 9, 2006

Related U.S. Application Data

(63) Continuation of application No. 10/815,474, filed on Mar. 31, 2004, now abandoned.

(51) Int. Cl.
*G08B 23/00* (2006.01)
*G08B 21/00* (2006.01)

(52) U.S. Cl. ............... 340/573.4; 340/573.1; 340/653; 340/660; 340/661

(58) Field of Classification Search ............. 340/572.4, 340/572.1, 653, 660, 661
See application file for complete search history.

(56) References Cited

U.S. PATENT DOCUMENTS

| | | | |
|---|---|---|---|
| 4,479,260 A | 10/1984 | Harrop | |
| 4,783,783 A | 11/1988 | Nagai et al. | |
| 4,935,702 A | 6/1990 | Mead et al. | |
| 5,068,668 A * | 11/1991 | Tsuda et al. | 342/362 |
| 5,280,286 A | 1/1994 | Williamson | |
| 5,528,222 A | 6/1996 | Moskowitz et al. | |
| 5,572,226 A | 11/1996 | Tuttle | |
| 5,719,586 A | 2/1998 | Tuttle | |
| 5,805,632 A | 9/1998 | Leger | |
| 5,923,300 A | 7/1999 | Mejia | |
| 5,933,039 A | 8/1999 | Hui et al. | |
| 5,939,945 A | 8/1999 | Thewes et al. | |
| 5,995,048 A | 11/1999 | Smithgall et al. | |
| 6,005,529 A | 12/1999 | Hutchinson | |
| 6,025,784 A | 2/2000 | Mish | |
| 6,043,746 A | 3/2000 | Sorrells | |
| 6,045,652 A | 4/2000 | Tuttle | |

(Continued)

FOREIGN PATENT DOCUMENTS

EP    0 298 618    1/1989

(Continued)

OTHER PUBLICATIONS

Carley, L. Richard, "Trimming Analog Circuits Using Floating-Gate Analog MOS Memory", IEEE Journal of Solid-State Circuits, vol. 24, No. 6, Dec. 1989, pp. 1569-1575.

(Continued)

*Primary Examiner*—Julie Lieu
(74) *Attorney, Agent, or Firm*—Thelen Reid Brown Raysman & Steiner LLP; David B. Ritchie (57) ABSTRACT

Circuits, devices and methods for use in RFID tags include receiving multiple RF signals from multiple ports. The signals are added after some processing, to produce a single combined signal. Additional components process the single combined signal by itself.

18 Claims, 5 Drawing Sheets

U.S. PATENT DOCUMENTS

| | | | |
|---|---|---|---|
| 6,060,815 | A | 5/2000 | Nysen |
| 6,069,564 | A | 5/2000 | Hatano et al. |
| 6,097,345 | A | 8/2000 | Walton |
| 6,118,379 | A | 9/2000 | Kodukula et al. |
| 6,130,570 | A | 10/2000 | Pan et al. |
| 6,130,612 | A | 10/2000 | Castellano et al. |
| 6,130,632 | A | 10/2000 | Opris |
| 6,134,182 | A | 10/2000 | Pilo |
| 6,147,655 | A | 11/2000 | Roesner |
| 6,166,706 | A | 12/2000 | Gallagher |
| 6,184,841 | B1 | 2/2001 | Shober et al. |
| 6,215,402 | B1 | 4/2001 | Rao Kodukula et al. |
| 6,266,362 | B1 | 7/2001 | Tuttle et al. |
| 6,268,796 | B1 | 7/2001 | Gnadinger et al. |
| 6,271,793 | B1 | 8/2001 | Brady et al. |
| 6,320,788 | B1 | 11/2001 | Sansbury et al. |
| 6,340,932 | B1 | 1/2002 | Rodgers et al. |
| 6,346,922 | B1 | 2/2002 | Proctor et al. |
| 6,357,025 | B1 | 3/2002 | Tuttle |
| 6,366,260 | B1 | 4/2002 | Carrender |
| 6,396,438 | B1 | 5/2002 | Seal |
| 6,445,297 | B1 | 9/2002 | Nicholson |
| 6,517,000 | B1 | 2/2003 | McAllister et al. |
| 6,571,617 | B2 | 6/2003 | Van Niekerk et al. |
| 6,677,917 | B2 | 1/2004 | Van Heerden et al. |
| 6,700,491 | B2 | 3/2004 | Shafer |
| 6,701,605 | B2 | 3/2004 | Huffer et al. |
| 6,717,923 | B1 | 4/2004 | Smith |
| 6,720,930 | B2 | 4/2004 | Johnson et al. |
| D492,670 | S | 7/2004 | Hung et al. |
| D493,446 | S | 7/2004 | Hung et al. |
| 6,830,193 | B2 | 12/2004 | Tanaka |
| 6,885,344 | B2 | 4/2005 | Mohamadi |
| 7,005,968 | B1 | 2/2006 | Bridgelall |
| 7,030,786 | B2 | 4/2006 | Kaplan et al. |
| 7,123,171 | B2 | 10/2006 | Kaplan et al. |
| 2001/0043162 | A1 | 11/2001 | Babb |
| 2002/0067315 | A1 | 6/2002 | Kunysz |
| 2002/0075184 | A1 | 6/2002 | Tuttle |
| 2002/0109636 | A1 | 8/2002 | Johnson et al. |
| 2002/0126057 | A1 | 9/2002 | King et al. |
| 2002/0167405 | A1 | 11/2002 | Shanks et al. |
| 2003/0090313 | A1 | 5/2003 | Burgener et al. |
| 2003/0184495 | A1 | 10/2003 | Tomon |
| 2004/0001024 | A1 | 1/2004 | Killen et al. |
| 2004/0075616 | A1 | 4/2004 | Endo et al. |
| 2004/0113746 | A1 | 6/2004 | Brindle |
| 2004/0125023 | A1 | 7/2004 | Fujii et al. |
| 2004/0183743 | A1 | 9/2004 | Reasoner et al. |
| 2005/0024186 | A1 | 2/2005 | Friedrich |
| 2005/0028032 | A1 | 2/2005 | Klein |
| 2005/0104789 | A1 | 5/2005 | Hshidate et al. |
| 2005/0104793 | A1 | 5/2005 | Yuanzhu |
| 2005/0104797 | A1 | 5/2005 | McCollum |
| 2005/0134460 | A1 | 6/2005 | Usami |
| 2005/0212674 | A1 | 9/2005 | Desmons et al. |
| 2005/0227631 | A1 | 10/2005 | Robinett |
| 2005/0259030 | A1 | 11/2005 | Mizuno et al. |
| 2005/0270185 | A1 | 12/2005 | Esterberg |
| 2005/0270189 | A1 | 12/2005 | Kaplan et al. |
| 2006/0028379 | A1 | 2/2006 | Oberle |
| 2006/0038725 | A1 | 2/2006 | Tikhov et al. |
| 2006/0038730 | A1 | 2/2006 | Parsche |
| 2006/0044192 | A1 | 3/2006 | Egbert |
| 2006/0055620 | A1 | 3/2006 | Oliver et al. |
| 2006/0139223 | A1 | 6/2006 | Li et al. |
| 2006/0208897 | A1 | 9/2006 | Chiu et al. |
| 2006/0208900 | A1 | 9/2006 | Hozouri |
| 2006/0244676 | A1 | 11/2006 | Uesaka |
| 2006/0262023 | A1 | 11/2006 | Engargiola et al. |
| 2007/0024446 | A1 | 2/2007 | Hyde et al. |

FOREIGN PATENT DOCUMENTS

| | | |
|---|---|---|
| EP | 0 416 264 | 3/1991 |
| WO | 01 73854 | 10/2001 |
| WO | 2004/063982 | 7/2004 |

OTHER PUBLICATIONS

Raszka et al., "Embedded Flash Memory for Security Applications in a 0.13 µm CMOS Logic Process", Digest of Technical Papers, IEEE International Solid-State Circuits Conference 2004, p. 46.

Yoshida, Junko, EE Times, "RFID "kill" Feature Aims to Soothe Privacy Fears", Apr. 28, 2003.

Jonietz, Erika, Technology Review, "Tracking Privacy", Jul./Aug. 2004, pp. 74-75.

Partial International Search for International Application No. PCT/US03/31792, date mailed Apr. 2, 2004.

* cited by examiner

RFID TAGS COMBINING SIGNALS RECEIVED FROM MULTIPLE RF PORTS

CROSS-REFERENCE TO RELATED APPLICATION

This application is a continuation of parent application Ser. No. 10/815,474, entitled "RFID Tags Combining Signals Received From Multiple RF Ports", now abandoned by John D. Hyde, Omer Onen and Ronald A. Oliver, filed on Mar. 31, 2004.

FIELD OF THE INVENTION

The present invention is related to the field of Radio Frequency Identification (RFID), and more specifically to devices, circuits, and methods for using multiple RF ports in RFID reader-to-tag communications.

BACKGROUND OF THE INVENTION

Radio Frequency IDentification (RFID) tags can be used in many ways for locating and identifying objects to which they are attached. RFID tags are particularly useful in product-related and service-related industries for tracking large numbers of objects are being processed, inventoried, or handled. In such cases, an RFID tag is usually attached to individual items, or to their respective packages.

In principle, RFID techniques entail using a device called an RFID reader to interrogate one or more RFID tags. Interrogation is performed by the reader transmitting an interrogating Radio Frequency (RF) wave during a transmit phase. During a receive phase, a tag that has received the interrogating RF wave responds by transmitting back another RF wave, a process known as backscatter. The response may further encode a number stored internally in the tag. The response, and the number if available, is decoded by the reader, which thereby identifies, counts, or otherwise interacts with the associated item. The number can denote a serial number, a price, a date, a destination, other attribute(s), any combination of attributes, and so on.

An RFID tag includes an antenna system, a radio section, a logical section, and a memory. Advances in semiconductor technology have miniaturized the electronics so much that an RFID tag can generate the backscatter while powered by only the RF signal it receives, enabling some RFID tags to operate without a battery.

It is desirable that the antenna system have components such that it can sense many possible types of interrogating RF waves, and from many possible directions, regardless of the orientation of the tag. For example, some RFID tags are provided with antennas that are suitable for sensing RF waves of different polarization. It has been known to have a system of two antennas, receiving two RF signals from them, processing them, and then choosing the strongest one. Such is taught, for example in Patent Application US 2002/0167405A1, published on Nov. 14, 2002 to Shanks et al. An inefficiency, however, is where the two RF signals are processed independently, using one set of components for each of the two RF signals. This requires more circuitry and more power than single antenna systems.

BRIEF SUMMARY

The invention improves over the prior art.

Briefly, the present invention provides circuits, devices and methods for use in RFID tags. A circuit according to the invention has multiple main RF ports, which may be coupled to corresponding points in the antenna system of a host RFID tag. A signal is received in at least some of the RF ports from the interrogating RF wave. At least two of the received signals are combined after some processing, to produce a single combined signal. Additional components process the single combined signal by itself, to decode data transmitted from the reader via the interrogating RF wave.

The invention offers the advantage that more than one antenna can be used, without needing a full sets of components to process the signal received at each main RF port. This results in diminished expenditure of occupied space and electrical power in the device.

A further, unexpected advantage of the invention is that there may be a stronger signal to work with. Indeed, combining the received signals may generate a stronger combined signal than if the stronger one of the received signals is selected individually. The combined signal can be stronger especially if the main RF ports receive signals of equal strength, which results in improved signal to noise ratio and in some instances incrementally larger detection range.

These and other features and advantages of the invention will be better understood from the specification of the invention, which includes the following Detailed Description and accompanying Drawings.

BRIEF DESCRIPTION OF THE DRAWINGS

The following Detailed Description proceeds with reference to the accompanying Drawings, in which.

DETAILED DESCRIPTION

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, circuits, methods, and so on. The following detailed description is, therefore, not to be taken in a limiting sense.

As has been mentioned, the invention provides circuits, devices and methods for use in RFID tags. A circuit according to the invention has multiple main RF ports, and the signals they receive are combined into a single combined signal, which is further treated by itself. The invention is now described in more detail.

The invention may be used with RFID tags having many types of antenna systems. Two such systems are described below as a way of example, but not of limitation.

Figure 1:
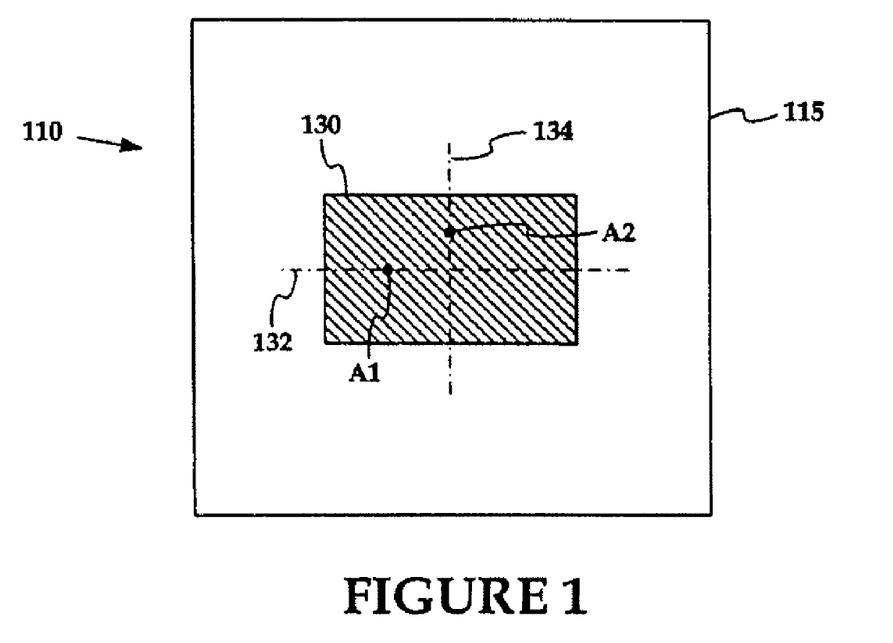
FIG. 1 is a view of an RFID tag with a first sample type of antenna system.

FIG. 1 is a view of a sample RFID tag 110 that may be used with the invention. Tag 110 is formed on a substrate 115, which does not conduct. Tag 110 has an antenna system that includes a rectangular conductive plate 130. Preferably it also includes a complementary matching plate (not shown) on the opposite of substrate 115. Backscatter signals may be generated by a circuit that resides on a chip (not shown in FIG. 1), and connected to the antenna system. The circuit receives an interrogating RF signal through the antenna during a receive phase, and drives the antenna system accordingly, during a transmit phase.

Conductive plate 130 has two main directions, one along horizontal axis 132 and one along vertical axis 134. The two directions result in two resonant modes for plate 130. The geometry of plate 130 is especially useful if the interrogating RF wave is circularly polarized. The circuit senses an interrogating RF signal, preferably at points on antenna plate 130 that are optimal for the prevailing resonant modes. Such points may, for example, be at antenna point A1 on axis 132 for a first polarization, and at antenna point A2 on axis 134 for a second polarization. Of course, receiving and sending may be with respect to a reference, which in turn may be applied to a complementary point of the complementary matching plate. For receiving and sending, wires (not shown) couple the circuit with antenna points A1, A2, and also with their complementary points on the complementary matching plate.

Figure 2:
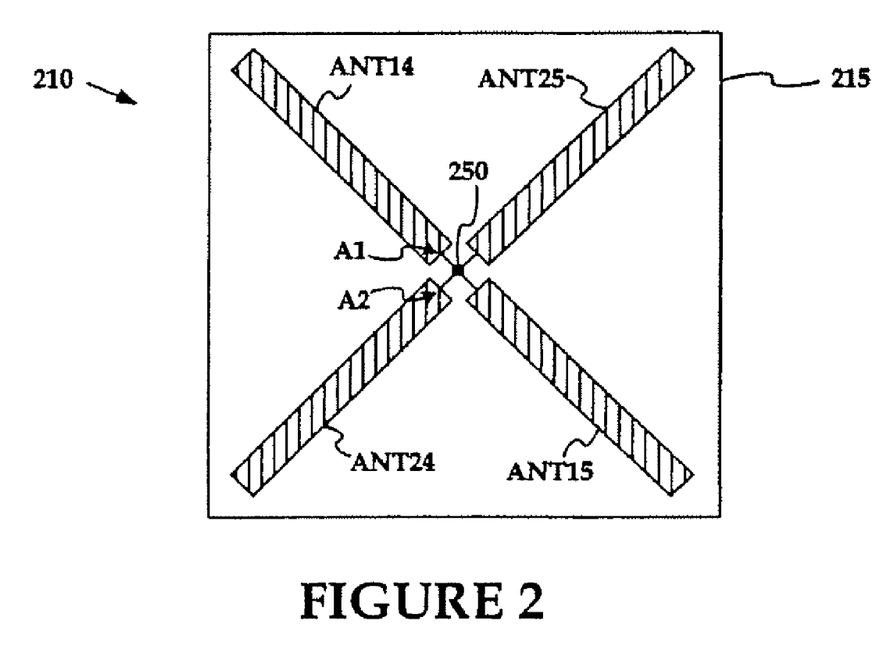
FIG. 2 is a view of another RFID tag with a second sample type of antenna system.

FIG. 2 is a view of another sample RFID tag 210 that may be used with the invention. Tag 210 is formed on a non-conducting substrate 215. A chip 250 on tag 210 includes a circuit, which generates backscatter.

Two substantially colinear antenna segments ANT14, ANT15 form a linear antenna for a first dominant polarization direction, while another two substantially collinear antenna segments ANT24, ANT25 form a second linear antenna for a second dominant polarization direction. The geometry of these antennas is especially useful if the interrogating RF wave is linearly polarized. Such a wave will generally generate a component in each of the linear antennas. In some instances, the components will be approximately equal in strength. In other instances, one of the components will be stronger than the other.

Receiving for a first polarization may be by comparing a signal received on antenna segment ANT14, at an antenna point A1. Comparing would be with respect to a reference, which may be complementary antenna segment ANT15. And receiving for a second polarization may be by comparing a signal received on antenna segment ANT24 at an antenna point A2 with respect to a reference, which may be complementary antenna segment ANT25.

The invention works regardless of the orientation of the antennas, or the polarization of the signals. The above was described to illustrate how the description below would be applicable even if the received signals had diverse polarizations. And the operation would be similar if there were no polarization difference.

Figure 3:
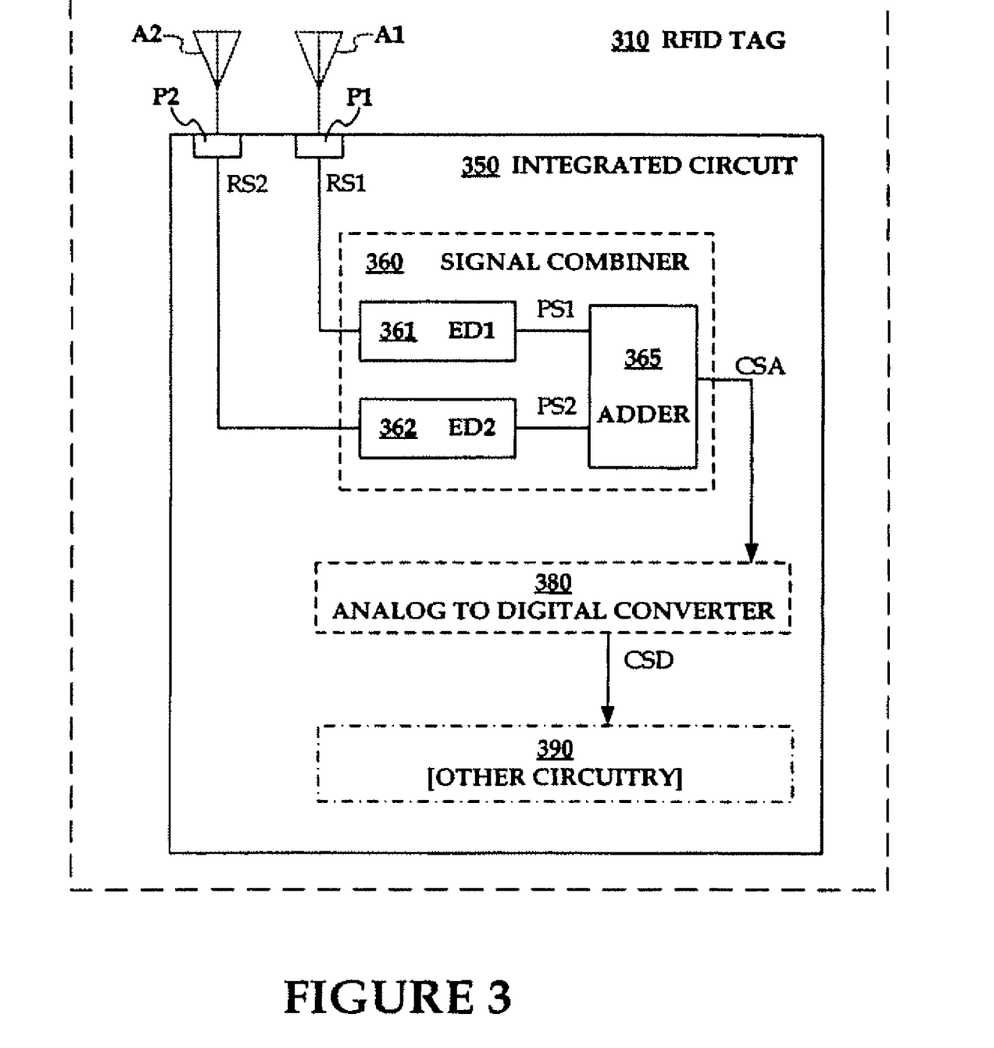
FIG. 3 is a block diagram of a circuit for an RFID tag according to an embodiment of the invention.

FIG. 3 shows a circuit 350 according to an embodiment of the invention, which is adapted for using in an RFID tag 310. Tag 310 includes an antenna system that may be made in a number of ways, such as shown in FIG. 1, FIG. 2, and so on. Circuit 350 is advantageously implemented as an integrated circuit, although that is not necessary for practicing the invention.

Circuit 350 includes two main RF ports P1, P2 that are suitable for coupling to respective antenna points A1, A2 of the antenna system of the host RFID tag 310. Coupling may be by wire, bump soldering, or other ways known in the art. Other components may further be coupled between one of ports P1, P2 and its respective one of antenna points A1, A2, such as an inductor or capacitor for tuning a frequency of the antenna system. Accordingly, port P1 is adapted to receive a first RF signal RS1, and port P2 is adapted to receive a second RF signal RS2, both as a result of the interrogating RF wave. The relative magnitudes of signals RS1 and RS2 may be different at any time, especially if they are derived from antennas of a different polarization, as described above with reference to FIG. 1, FIG. 2.

While only two main RF ports P1, P2 are shown, the invention is capable of being implemented with three or more just as well. That could be desirable, for example, when more elaborate antenna systems are used to address more polarizations. For each main port being added, a new received signal would become available, and components would have to be added to address it, so that the invention works as described.

Circuit 350 also includes a signal combiner 360. Signal combiner 360 receives signals RS1, RS2 and generates a combined signal CSA from them. Combining takes place after some processing of the individual received signals RS1, RS2. The extent of processing depends on the embodiment.

In the embodiment of FIG. 3, processing includes envelope detection. Signal combiner 360 includes a first envelope detector ED1 361 that generates a first processed signal PS1 from first received signal RS1. Signal combiner 360 moreover includes a second envelope detector ED2 362 that generates a second processed signal PS2 from second received signal RS2. Each of envelope detectors ED1 361, ED2 362 may be made as described in more detail later in this document.

Signal combiner 360 further includes an adder 365 to generate the combined signal CSA from first and second processed signals PS1, PS2. In one embodiment, adder 365 is adapted to add together the first and second processed signals PS1, PS2. Depending on the embodiment, the adder may be analog, digital, and so on.

Circuit 350 further includes an analog to digital converter 380. Converter 380 is adapted to generate a digital signal CSD from the combined signal CSA. Converter 380 may be implemented in any way known in the art for processing the output of an envelope detection block in the demodulator circuit of an RFID chip, which receives a signal from a single antenna.

Circuit 350 further includes additional circuitry 390, which may be adapted to process digital signal CSD as if it were a demodulated signal that was received from a single antenna. Circuitry 390 may access a memory, include a modulator, and even use the same main ports P1, P2 to backscatter.

It will be appreciated that the present invention eventually produces a single demodulated signal, while receiving the combined benefit of both antennas. In the event that the detection results in one of received signals RS1, RS2 dominating the other, that might not make much difference. But when the two received signals RS1, RS2 have comparable strength, the combined signal may be stronger than either one of them alone. This is an improvement over the prior art, and even accomplished with fewer components than the prior art.

Figure 4:
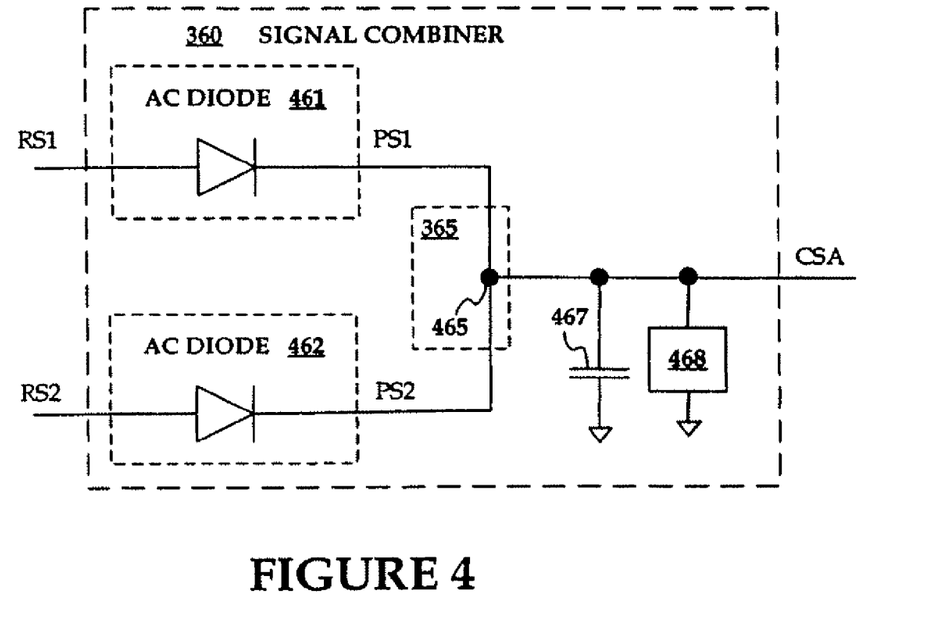
FIG. 4 is a diagram showing an implementation of a signal combiner of the diagram of FIG. 3.

FIG. 4 is a schematic showing a more particular implementation of signal combiner 360 of FIG. 3. Envelope detectors ED1 361, ED2 362 are implemented by AC diodes 461, 462, respectively. AC diodes are described in more detail later in this document, with reference to FIG. 6.

In the embodiment of FIG. 4, adder 365 includes a node 465, on which signals PS1, PS2 are added. The signals being added at node 465 may be electrical currents. In one embodiment of the invention, there is a capacitor 467 coupled to node 465, in which case combined signal CSA becomes a voltage. In some of these embodiments, there is also provided a discharging component 468 for occasionally discharging the capacitor 467. Component 468 may be any one of a resistor, a current source, a transistor, and so on, as will be evident to a person skilled in the art.

Figure 5:
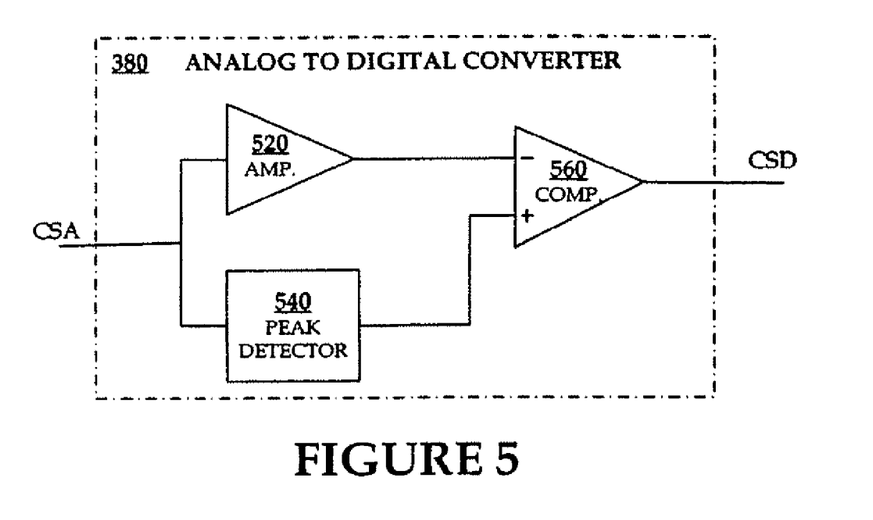
FIG. 5 is a schematic showing an implementation of an analog to digital converter of the circuit diagram of FIG. 3.

FIG. 5 is a schematic showing a possible implementation of analog to digital converter 380 of FIG. 3, designed to work especially well for pulse width encoded data. Converter 380 includes a comparator 560 that outputs digital signal CSD from analog combined signal CSA. Converter 380 includes optional amplifier 520, to provide an amplified version of combined signal CSA. Converter 380 also includes a peak detector 540 to detect peaks of combined signal CSA. An offsetting circuit (not shown in FIG. 5) may also be employed.

Comparator 560 compares a version of the detected peaks with a version of combined signal CSA, such as combined signal CSA itself, or the amplified version from amplifier 520, if the latter is provided. In this comparison, either one of the versions may employ an offset for the signal, either as a subtraction from the peak detector, or as an addition to combined signal CSA. The offset may be incorporated in the input stage of comparator 560, by using a deliberately mismatched input differential pair, in which case a separate offsetting circuit is not needed.

As will be evident to a person skilled in the art, the circuit of FIG. 5 may be modified if the data of the interrogating RF wave is encoded differently. For example, for Manchester encoded data, the DC average is guaranteed to be 50%. Accordingly, instead of employing peak detector 540, an average value detector may be used instead. The extracted average value may be compared in comparator 560 with a version of combined signal CSA.

Figure 6:
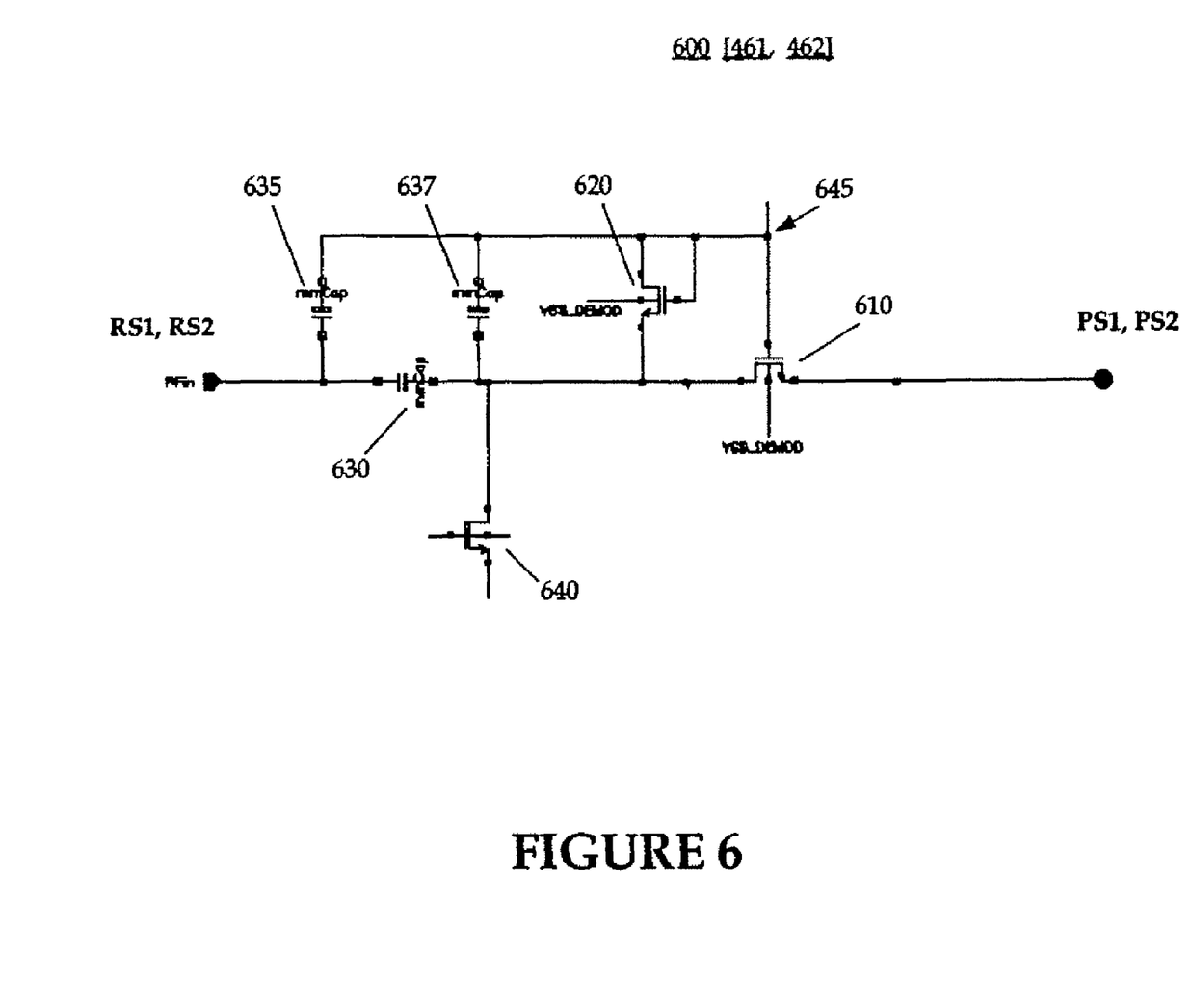
FIG. 6 is a detailed schematic for implementing one of the AC diodes of FIG. 4.

FIG. 6 is a detailed schematic of a circuit 600 for implementing either one, or each one, of AC diodes 461, 462 of FIG. 4. An AC diode is a circuit that operates as a diode blocking the DC component, but passes the AC component of received signals RS1, RS2.

Circuit 600 includes a transistor 610, which is biased near its ON/OFF threshold. Another transistor 620 provides a current mirror, to ensure transistor 610 remains biased near its ON/OFF threshold. Bias current is supplied to transistors 610, 620 through node 645 via a source (not shown).

A capacitor 630 blocks the DC component of signal RS1, while permitting substantially all the AC component of signal RS1 to be passed. Capacitors 635, 637 provide signal to the gate of transistor 610, to switch it ON/OFF from signal RS1, for permitting the AC component of signal RS1 to be passed through transistor 610.

Transistor 640 acts as a current source for draining current supplied to circuit 600 at node 645, and as a diode in a remainder of the cycle. Additional components may be further added to circuit 600, such as a diode to clamp the voltage, to account for the fact that received signal RS1 may range widely from −12 dBm to +20 dBm.

Figure 7:
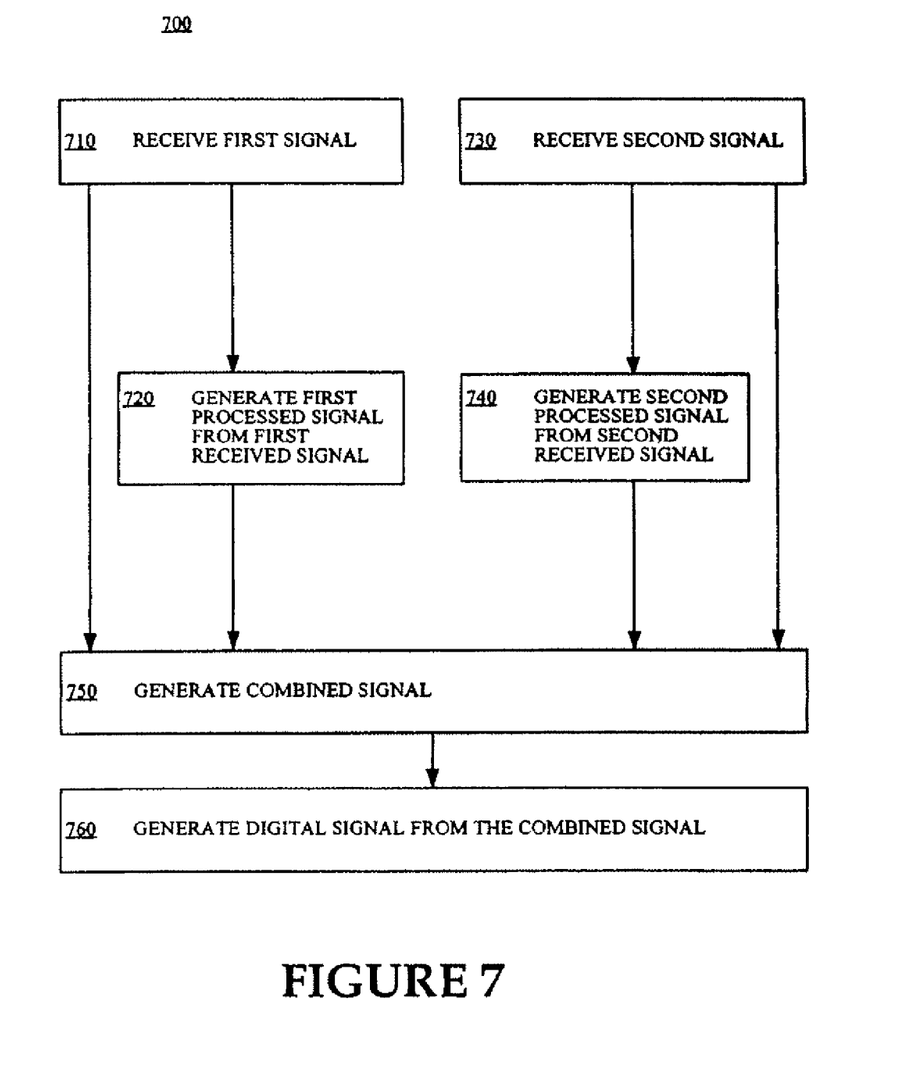
FIG. 7 is a flowchart illustrating a method according to an embodiment of the present invention.

FIG. 7 is flowchart 700 illustrating a method according to an embodiment of the invention. The method of flowchart 700 may be practiced by different embodiments of the invention, including but not limited to circuit 350.

At block 710, a first RF signal is received. At optional next block 720, a first processed signal is generated from the first received signal. In one embodiment, the first processed signal is generated by detecting an envelope of the first received signal.

At another block 730, a second RF signal is received. The second received signal may have a different polarization than the first received signal. At optional next block 740, a second processed signal is generated from the second received signal.

At next block 750, a combined signal is received from the first and second signals, after some processing. The amount of processing varies with the particular embodiment. Combining may be performed by adding together the first processed signal and the second processed signal. Adding together may be performed at a suitable adder. If currents are being added, then addition may take place at a node.

At next block 760, a digital signal is generated from the combined signal. The digital signal may be generated by detecting peaks from the combined signal, and comparing a version of the combined signal to a version of the detected peaks. The comparison may employ an offset. Alternately, the digital signal may be generated by detecting an average value of the combined signal, and comparing a version of the combined signal to a version of the detected average value.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

What is claimed is:

1. A circuit for use in an RFID tag, comprising:
a first RF port for receiving a first signal;
a second RF port for receiving a second signal;
a signal combiner for generating a combined signal from the first received signal and the second received signal; and
an analog to digital converter for generating a digital signal from the combined signal,
wherein the signal combiner includes
a first envelope detector for generating a first processed signal from the first received signal,
a second envelope detector for generating a second processed signal from the second received signal, and
an adder to generate the combined signal from the first processed signal and the second processed signal.

2. The circuit of claim 1, wherein
the adder is adapted to add together the first processed signal and the second processed signal.

3. The circuit of claim 1, wherein
the first envelope detector includes an AC diode.

4. The circuit of claim 1, wherein,
the adder includes a node.

5. The circuit of claim 4, further comprising:
a capacitor coupled to the node.

6. The circuit of claim 5, further comprising:
a discharging component for discharging the capacitor.

7. The circuit of claim 6, wherein
the discharging component includes one of a resistor, a current source, and a transistor.

8. The circuit of claim 1, wherein
the analog to digital converter includes a peak detector to detect peaks of the combined signal.

9. The circuit of claim 1, wherein
the analog to digital converter includes a comparator.

10. A device for use in an RFID tag comprising:
means for generating a combined signal from a first signal received at a first RF port and a second signal received at a second RF port; and
means for generating a digital signal from the combined signal,
wherein the means for generating the digital signal includes
means for detecting peaks from the combined signal, and
means for comparing a version of the combined signal to a version of the detected peaks.

11. A device for use in an RFID tag comprising:
means for generating a combined signal from a first signal received at a first RF port and a second signal received at a second RF port; and
means for generating a digital signal from the combined signal,
wherein the means for generating the digital signal includes
means for detecting an average value of the combined signal, and
means for comparing a version of the combined signal to a version of the detected average value.

12. A device for use in an RFID tag comprising:
means for generating a combined signal from a first signal received at a first RF port and a second signal received at a second RF port;
means for generating a digital signal from the combined signal;
means for generating a first processed signal from the first received signal, wherein the first processed signal is used to generate the combined signal and
the means for generating the first processed signal includes an envelope detector.

13. A device for use in an RFID tag comprising:
means for generating a combined signal from a first signal received at a first RF port and a second signal received at a second RF port;
means for generating a digital signal from the combined signal wherein the means for generating the digital signal includes an adder;
means for generating a first processed signal from the first received signal,
wherein the first processed signal is used to generate the combined signal; and
means for generating a second processed signal from the second received signal,
wherein the second processed signal is used to generate the combined signal.

14. A method for using a circuit of an RFID tag, comprising:
receiving a first signal at a first RF port;
receiving a second signal at a second RF port;
generating a combined signal from the first received signal and the second received signal; and
generating a digital signal from the combined signal,
wherein the digital signal is generated by
detecting peaks from the combined signal, and
comparing a version of the combined signal to a version of the detected peaks.

15. A method for using a circuit of an RFID tag, comprising:
receiving a first signal at a first RF port;
receiving a second signal at a second RF port;
generating a combined signal from the first received signal and the second received signal; and
generating a digital signal from the combined signal,
wherein the digital signal is generated by
detecting an average value of the combined signal, and
comparing a version of the combined signal to a version of the detected average value.

16. A method for using a circuit of an RFID tag, comprising:
receiving a first signal at a first RF port;
receiving a second signal at a second RF port;
generating a combined signal form the first received signal and the second received signal;
generating a digital signal form the combined signal;
generating a first processed signal from the first received signal; and
using the first processed signal to generate the combined signal,
wherein generating the first processed signal is performed by detecting an envelope of the first received signal.

17. A method for using a circuit of an RFID tag, comprising:
receiving a first signal at a first RF port;
receiving a second signal at a second RF port;
generating a combined signal from the first received signal and the second received signal;
generating a digital signal from the combined signal;
generating a second processed signal from the second received signal;
using the second processed signal to generate the combined signal;
generating a first processed signal from the first received signal; and
using the first processed signal to generate the combined signal,
wherein the combined signal is generated at a node.

18. The method of claim 17, wherein
combining is performed by adding together the first processed signal and the second processed signal.

* * * * *